(12) United States Patent
Katayama et al.

(10) Patent No.: US 8,707,067 B2
(45) Date of Patent: Apr. 22, 2014

(54) POWER SUPPLY CONTROLLING SYSTEM, CONTROL METHOD FOR POWER SUPPLY CONTROLLING SYSTEM, AND POWER SUPPLY CONTROLLING APPARATUS

(75) Inventors: Shinichi Katayama, Shinagawa (JP); Naoyuki Nagao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 243 days.

(21) Appl. No.: 13/067,412

(22) Filed: May 31, 2011

(65) Prior Publication Data
US 2011/0296210 A1 Dec. 1, 2011

(30) Foreign Application Priority Data
May 31, 2010 (JP) .................................. 2010-123786

(51) Int. Cl.
*G06F 1/26* (2006.01)
(52) U.S. Cl.
USPC .............. 713/310; 713/300; 713/340; 714/14
(58) Field of Classification Search
None
See application file for complete search history.

(56) References Cited

U.S. PATENT DOCUMENTS

| | | | |
|---|---|---|---|
| 4,677,566 A * | 6/1987 | Whittaker et al. | 700/295 |
| 5,051,720 A * | 9/1991 | Kittirutsunetorn | 340/12.33 |
| 7,461,130 B1 * | 12/2008 | AbdelAziz et al. | 709/208 |
| 2006/0280112 A1 | 12/2006 | Fujii | |
| 2008/0098113 A1 * | 4/2008 | Hansen et al. | 709/226 |
| 2008/0155082 A1 | 6/2008 | Ohtani et al. | |

FOREIGN PATENT DOCUMENTS

| | | |
|---|---|---|
| JP | 62-500269 | 1/1987 |
| JP | 2002-73221 | 3/2002 |
| JP | 2004-259030 | 9/2004 |
| JP | 2004-320530 | 11/2004 |
| JP | 2008-158711 | 7/2008 |
| WO | WO 86/02185 | 4/1986 |

OTHER PUBLICATIONS

Japanese Office Action issued on Oct. 22, 2013 for copending Japanese Patent Application No. 2010-123786.

* cited by examiner

*Primary Examiner* — Paul Yanchus, III
(74) *Attorney, Agent, or Firm* — Staas & Halsey LLP

(57) ABSTRACT

A power supply controlling system including: a first power supply controlling apparatus that supplies an electric power to a device; and a second power supply controlling apparatus that supplies an electric power to another device, communicates with the first power supply controlling apparatus, and mediates communication between the first power supply controlling apparatus and a terminal device to control power supply to the device, the terminal device controlling the power supply to the device; wherein the first power supply controlling apparatus communicates with the terminal device without relaying the second power supply controlling apparatus, according to interruption of the communication between the first power supply controlling apparatus and the second power supply controlling apparatus.

8 Claims, 7 Drawing Sheets

POWER SUPPLY CONTROLLING SYSTEM, CONTROL METHOD FOR POWER SUPPLY CONTROLLING SYSTEM, AND POWER SUPPLY CONTROLLING APPARATUS

CROSS-REFERENCE TO RELATED APPLICATION

This application is based upon and claims the benefit of priority of the prior Japanese Patent Application No. 2010-123786, filed on May 31, 2010, the entire contents of which are incorporated herein by reference.

FIELD

A certain aspect of the embodiment discussed herein is related to a power supply controlling system, a control method for the power supply controlling system, and a power supply controlling apparatus.

BACKGROUND

There is a case where plural computers and peripheral devices thereof are connected to each other and they are used. In this case, it is demanded to manage the power supply of each device efficiently.

A document 1 (Japanese Laid-Open Patent Publication No. 2004-259030) discloses a power supply controlling apparatus that supplies an electric power to plural devices, and switches a power supply on or off for each device. A document 2 (Japanese Laid-Open Patent Publication No. 62-500269) discloses a power supply controlling system that includes a master power supply controlling apparatus controlling the system, and a slave power supply controlling apparatus controlled by the master power supply controlling apparatus. A document 3 (Japanese Laid-Open Patent Publication No. 2002-73221) discloses a system that includes plural uninterruptible power supply units supplying an electric power, and a control device executing supervisor control.

However, when an controller in the above-mentioned apparatus or the above-mentioned system, and the master power supply controlling apparatus are lost, the power supply cannot be efficiently managed.

SUMMARY

According to an aspect of the present invention, there is provided a power supply controlling system including: a first power supply controlling apparatus that supplies an electric power to a device; and a second power supply controlling apparatus that supplies an electric power to another device, communicates with the first power supply controlling apparatus, and mediates communication between the first power supply controlling apparatus and a terminal device to control power supply to the device, the terminal device controlling the power supply to the device; wherein the first power supply controlling apparatus communicates with the terminal device without relaying the second power supply controlling apparatus, according to interruption of the communication between the first power supply controlling apparatus and the second power supply controlling apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will now be given, with reference to the accompanying drawings, of an embodiment of the present invention.

Embodiment

Figure 1:
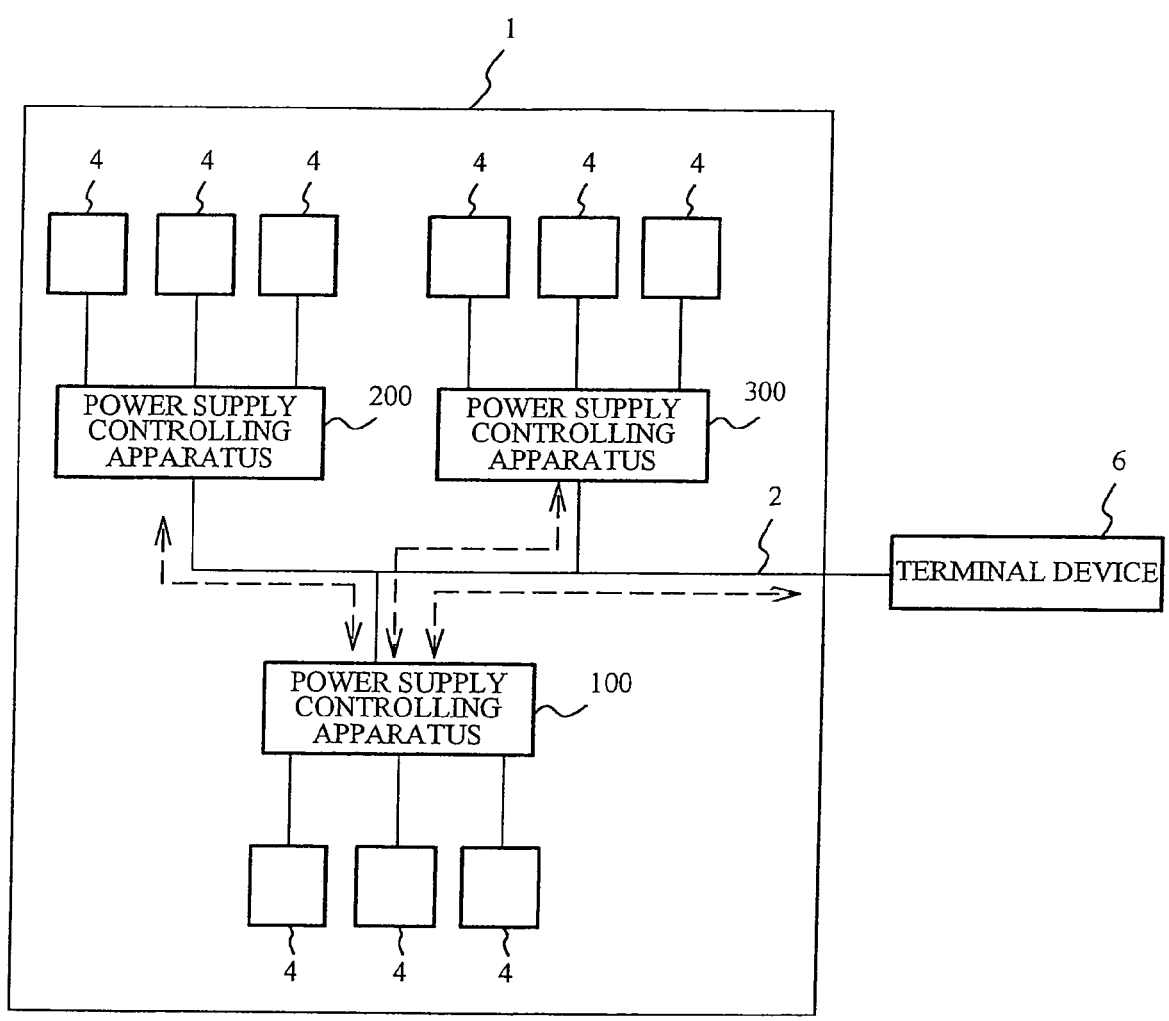
FIG. 1 is a block diagram illustrating the configuration of a power supply controlling system according to an embodiment.

First, a description will now be given of the configuration of a power supply controlling system according to an embodiment. FIG. 1 is a block diagram illustrating the configuration of a power supply controlling system according to an embodiment.

As illustrated in FIG. 1, a power supply controlling system 1 includes a power supply controlling apparatus 100 (a second power supply controlling apparatus), power supply controlling apparatuses 200 and 300 (a first power supply controlling apparatus). Devices 4 are connected to each of the power supply controlling apparatuses 100, 200 and 300, for example. The power supply controlling apparatuses 100, 200 and 300 are connected to each other by a network 2, and communicate with each other. The power supply controlling system 1 communicates, via the network 2, with a terminal device 6 which a user of the power supply controlling system 1 uses.

The power supply controlling apparatuses 100, 200 and 300 are power supply controlling apparatuses of the same model, for example. The network 2 is an Internet, a LAN (Local Area Network), or the like. A TCP/IP protocol is used for the communication, for example. The power supply controlling apparatuses 100, 200 and 300, and the terminal device 6 have unique MAC (Media Access Control) addresses, respectively. The devices 4 are computers, printers, or the like. The terminal device 6 is a PC (Personal Computer), for example.

Each of the power supply controlling apparatuses 100, 200 and 300 supplies an electric power to the devices 4 connected thereto. By using the terminal device 6, the user switches on or off the electric power supplied from each power supply controlling apparatus, executes scheduling of the power supply, and comprehends a history of electric power consumption. That is, the terminal device 6 controls the power supply to the devices 4 with each power supply controlling apparatus.

As illustrated by an arrow of a broken line in FIG. 1, the power supply controlling apparatus 100 communicates with the terminal device 6 to control the power supply to the devices 4 with the power supply controlling apparatus 100. The power supply controlling apparatus 100 mediates the communication between the terminal device 6 and each of the power supply controlling apparatuses 200 and 300 to control the power supply to the devices 4 with each of the power supply controlling apparatuses 200 and 300. That is, the power supply controlling apparatus 100 functions as a master of the power supply controlling system 1, and each of the power supply controlling apparatuses 200 and 300 functions as a slave of the power supply controlling system 1. Even if the user does not know information on the communication with each of the power supply controlling apparatuses 200 and 300, the user can control each of the power supply controlling apparatuses 200 and 300 via the power supply controlling apparatus 100. Therefore, the management man-hour can be reduced.

The power supply controlling apparatus 100 notifies the power supply controlling apparatuses 200 and 300 of information on the electric power which the power supply controlling apparatus 100 has supplied to the devices 4 connected thereto, and information on the communication with the terminal device 6. Each of the power supply controlling apparatuses 200 and 300 notifies the power supply controlling apparatus 100 of information on the electric power which each of the power supply controlling apparatuses 200 and 300 has supplied to the devices 4 connected thereto.

The information on the electric power includes the electric power and an electric power amount which each of the power supply controlling apparatuses has supplied to the devices 4 connected thereto. The information on the communication with the terminal device 6 includes the MAC address assigned to the terminal device 6, information on a communication path, and so on, for example.

Figure 2:
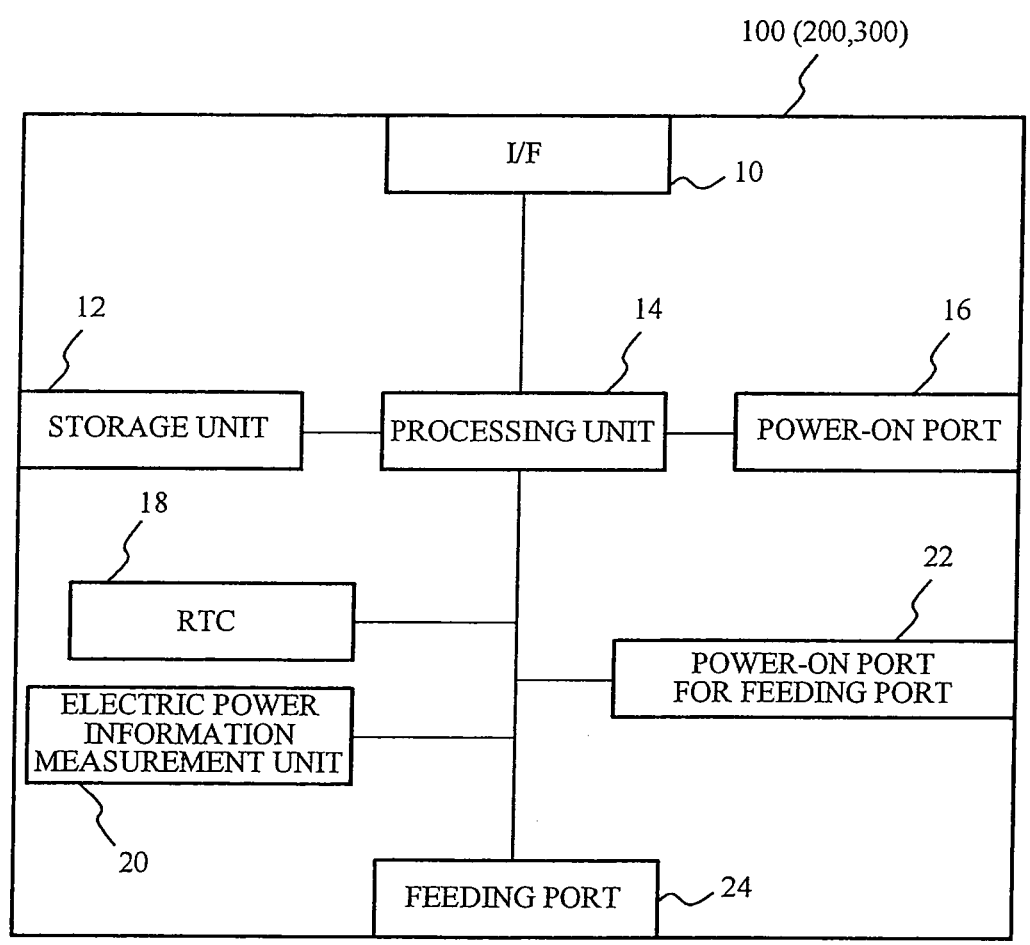
FIG. 2 is a block diagram illustrating the configuration of a power supply controlling apparatus according to the embodiment.

Next, a description will now be given of the configuration of the power supply controlling apparatus 100. The configuration of each of the power supply controlling apparatuses 200 and 300 is the same as that of the power supply controlling apparatus 100, and therefore description thereof is omitted. FIG. 2 is a block diagram illustrating the configuration of the power supply controlling apparatus 100.

As illustrated in FIG. 2, the power supply controlling apparatus 100 includes an interface (I/F) 10, a storage unit 12, a processing unit 14, a power-on port 16, a real time clock (RTC) 18, an electric power information measurement unit 20, a power-on port for feeding port 22, and a feeding port 24.

The power-on port 16 is an input port of an alternating-current (AC) power supply, for example. The power supply controlling apparatus 100 operates by using the electric power input from the power-on port 16. The power supply controlling apparatus 100 communicates with another power supply controlling apparatus via the I/F 10. When the power supply controlling apparatus 100 functions as the master, the power supply controlling apparatus 100 communicates with the terminal device 6 via the I/F 10.

The power-on port for feeding port 22 is an input port of an alternating-current (AC) power supply, for example. The feeding port 24 is an outlet, for example. A plug of the device 4 is inserted into the feeding port 24. The feeding port 24 supplies the electric power supplied from the power-on port for feeding port 22, to the device 4. The electric power information measurement unit 20 includes an ampere meter and a voltage indicator, measures a current that flows to the feeding port 24 and a voltage applied to the feeding port 24, and measures the electric power consumption of the feeding port 24. The RTC 18 is a clock, and measures the time.

The processing unit 14 is a CPU (Central Processing Unit), for example. The processing unit 14 controls the I/F 10, the storage unit 12, the power-on port 16, the RTC 18, the electric power information measurement unit 20, the power-on port for feeding port 22, and the feeding port 24. The processing unit 14 obtains the time from the RTC 18, and the electric power from the electric power information measurement unit 20. The processing unit 14 calculates the electric power consumption of the feeding port 24 depending on the obtained time and the obtained electric power. The processing unit 14 can execute the scheduling of the power supply based on the time measured by the RTC 18. The scheduling is that a schedule of on/off of the power supply with the power supply controlling apparatus 100 is set for each time zone or for each day of the week, for example.

The storage unit 12 is a hard disk drive (HDD), a memory, or the like. The storage unit 12 stores information on the electric power and the electric power amount supplied to the devices 4, information on the communication with the terminal device 6 and another power supply controlling apparatuses, and so on. As illustrated in FIG. 1, the power supply controlling apparatus 100 that functions as the master communicates with the terminal device 6 by using information on a communication path to the terminal device 6, stored into the storage unit 12.

Figure 3A:
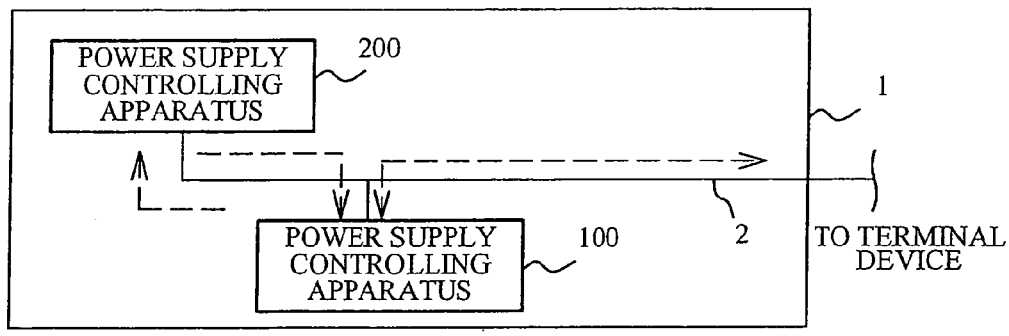
FIG. 3A is a block diagram illustrating the power supply controlling system when two power supply controlling apparatuses are connected to each other.
Figure 3B:
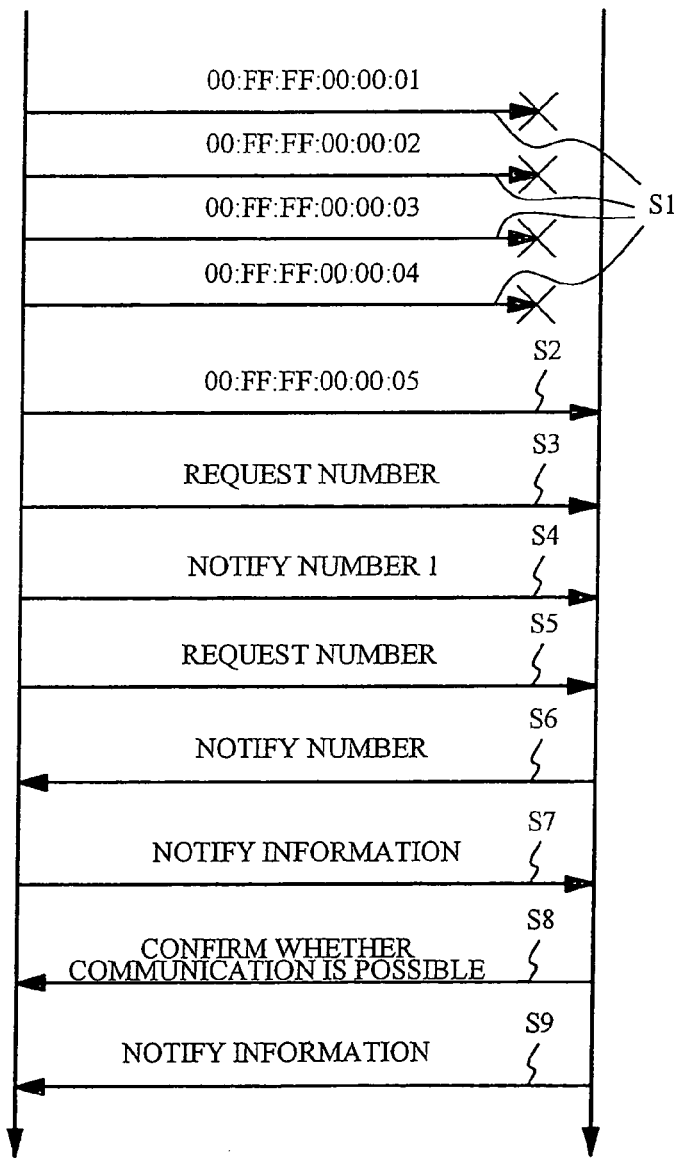
FIG. 3B is a sequence diagram illustrating the operation of the power supply controlling system according to the embodiment.

Next, a description will now be given of the operation of the power supply controlling system 1. First, a description will be given of the operation of the power supply controlling system 1 in a case where the power supply controlling apparatuses are connected to each other. FIG. 3A is a block diagram illustrating the power supply controlling system when two power supply controlling apparatuses are connected to each other. FIG. 3B is a sequence diagram illustrating the operation of the power supply controlling system 1 according to the embodiment.

As illustrated in FIGS. 3A and 3B, when the power supply controlling apparatuses 100 and 200 are connected to each other, the processing unit 14 (specifically, a communication unit 32 described later) of the power supply controlling apparatuses 100 retrieves a MAC address that can be communicated (step S1). Here, the MAC address used for the embodiment is described.

For example, the MAC address is indicated by a sign of 12 digits like "00:FF:FF:00:00:01". Eight digits of a front part of the MAC address, i.e., "00:FF:FF:00" indicate a model of hardware to which the MAC address is assigned. The power supply controlling apparatuses 100, 200 and 300 constituting the power supply controlling system 1 are the same models, and hence the front part of the MAC address is common to the respective power supply controlling apparatuses. A latter part of the MAC address indicates each of the power supply controlling apparatuses. It is assumed that the MAC address assigned to the power supply controlling apparatus 200 is "00:FF:FF:00:00:05".

As illustrated in step S1 of FIG. 3B, the processing unit 14 of the power supply controlling apparatus 100 transmits signals to MAC addresses in which the last number is 1 and then increased one by one, and judges whether the processing unit 14 can communicate with each of the MAC addresses. Here, the power supply controlling apparatuses corresponding to the MAC addresses "00:FF:FF:00:00:01" to "00:FF:FF00:00:04" are not connected to the power supply controlling apparatus 100, and hence the power supply controlling apparatus 100 cannot communicate with the power supply controlling apparatuses corresponding to the MAC addresses "00:FF:FF:00:00:01" to "00:FF:FF:00:00:04".

Since the MAC Address "00:FF:FF:00:00:05" is assigned to the power supply controlling apparatus 200, the processing unit 14 of the power supply controlling apparatus 100 can communicate with the processing unit 14 of the power supply controlling apparatus 200 (step S2).

The processing unit 14 of the power supply controlling apparatus 100 request the processing unit 14 of the power supply controlling apparatus 200 to notify the power supply controlling apparatus 100 of a number (step S3). The number is a number assigned to each of the power supply controlling apparatuses included in the power supply controlling system 1. In a stage of step S3 in FIG. 3A, a number "0" is given to the power supply controlling apparatus 100, but a specific number is not given to the power supply controlling apparatus 200. After step S3, the processing unit 14 of the power supply controlling apparatus 100 gives a number "1" to the processing unit 14 of the power supply controlling apparatus 200 (step S4).

After step S4, the processing unit 14 of the power supply controlling apparatus 100 requests the processing unit 14 of the power supply controlling apparatus 200 to notify the number of the power supply controlling apparatus 200 (step S5). The processing unit 14 of the power supply controlling apparatus 200 notifies the processing unit 14 of the power supply controlling apparatus 100 of the number "1" given at step S4, according to the request of the power supply controlling apparatus 100 (step S6).

After step S6, the processing unit 14 of the power supply controlling apparatus 100 notifies the processing unit 14 of the power supply controlling apparatus 200 of given information (step S7). The given information includes information on the supplied electric power such as a history of the electric power and the electric power amount which the power supply controlling apparatus 100 has supplied to the devices 4. The given information further includes information on the communication between the power supply controlling apparatus 100 and the terminal device 6 such as the MAC address of the terminal device 6.

After step S7, the processing unit 14 of the power supply controlling apparatus 200 confirms whether the processing unit 14 of the power supply controlling apparatus 200 can communicate with the processing unit 14 of the power supply controlling apparatus 100 (step S8). As illustrated in FIG. 3A, the power supply controlling apparatus 200 is connected to the power supply controlling apparatus 100 by the network 2, and can communicate with the power supply controlling apparatus 100. After step S8, the processing unit 14 of the power supply controlling apparatus 200 notifies the processing unit 14 of the power supply controlling apparatus 100 of given information (step S9). The given information includes information on the electric power which the power supply controlling apparatus 200 has supplied to the devices 4.

As described above, the power supply controlling apparatus 100 is connected to the power supply controlling apparatus 200, and the power supply controlling system 1 includes the power supply controlling apparatuses 100 and 200. As described in steps S4 and S7, the power supply controlling apparatus 100 that functions as the master gives the number to the power supply controlling apparatus 200 that functions as the slave, and notifies the power supply controlling apparatus 200 of the information on the electric power which the power supply controlling apparatus 100 has supplied to the devices 4, and the information on the communication on the terminal device 6. On the other hand, the power supply controlling apparatus 200 notifies the power supply controlling apparatus 100 of the information on the electric power which the power supply controlling apparatus 200 has supplied to the devices 4. Even when the power supply controlling apparatus 300 is connected to the network 2, the control similar to FIG. 3B is done, and the power supply controlling system 1 as illustrated in FIG. 1 is formed. Even when another power supply controlling apparatus is further added, the control similar to FIG. 3B is done.

Figure 4A:
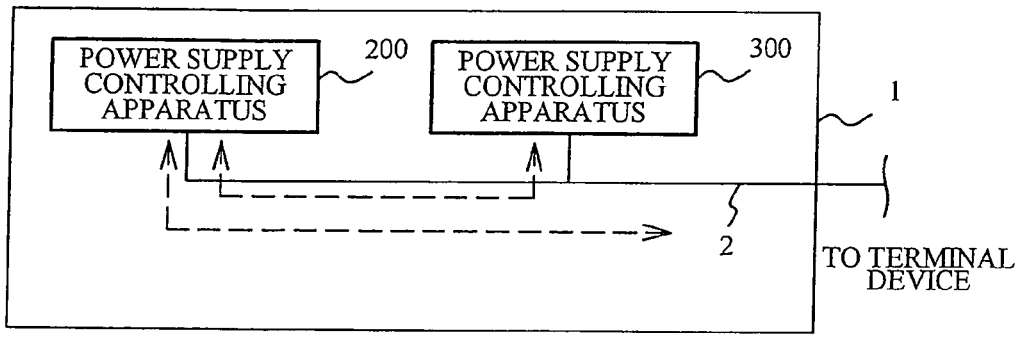
FIG. 4A is a block diagram illustrating the power supply controlling system when the communication with one power supply controlling apparatus is interrupted.
Figure 4B:
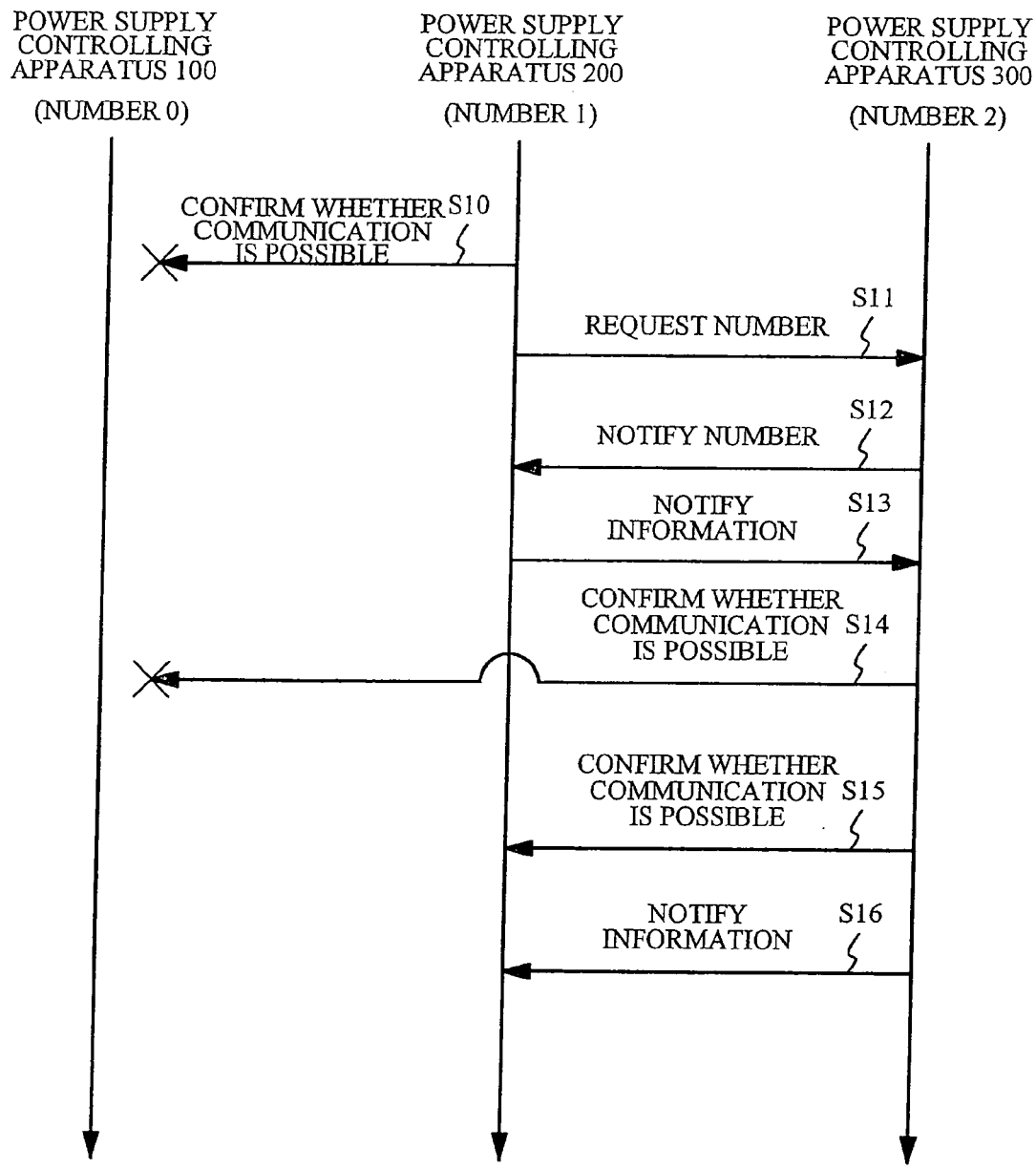
FIG. 4B is a sequence diagram illustrating the operation of the power supply controlling system according to the embodiment.

It is assumed that the communication between the power supply controlling apparatus functioning as the master and the power supply controlling apparatus functioning as the slave is interrupt. This is a case where the connection between the power supply controlling apparatus 100 and the network 2 is cut, such as a case where the maintenance of the power supply controlling apparatus 100 is executed and a case where the power supply controlling apparatus 100 is removed for trouble. FIG. 4A is a block diagram illustrating the power supply controlling system 1 when there is not the power supply controlling apparatus 100. FIG. 4B is a sequence diagram illustrating the operation of the power supply controlling system 1 according to the embodiment. It is assumed that the numbers "0", "1", and "2" are given to the power supply controlling apparatuses 100, 200, and 300, respectively.

As illustrated in FIG. 4A, the power supply controlling apparatus 100 that functions as the master is lost, and the power supply controlling system 1 is composed of the power supply controlling apparatuses 200 and 300. The power supply controlling apparatus 100 functioning as the master has mediated the communication between outside of the power supply controlling system 1, i.e., the terminal device 6 and each of the power supply controlling apparatuses 200 and 300 functioning as the slave. When the master is lost, it becomes difficult to communicate between the terminal device 6 and the slave, and to control the power supply controlling system 1.

As illustrated in FIG. 4B, the processing unit 14 of the power supply controlling apparatus 200 confirms whether the processing unit 14 of the power supply controlling apparatus 200 can communicate with the processing unit 14 of the power supply controlling apparatus 100 (step S10). As described above, the connection between the power supply controlling apparatus 100 and the network 2 is cut, and the communication between the power supply controlling apparatuses 100 and 200 is also interrupted. In this case, in the power supply controlling apparatuses 200 and 300 that has functioned as the slaves, the power supply controlling apparatus 200 to which a small number has been given functions as the master.

After step S10, the processing unit 14 of the power supply controlling apparatus 200 that functions as the master requests the processing unit 14 of the power supply controlling apparatus 300 to notify the power supply controlling apparatus 200 of the number (step S11). After step S11, the processing unit 14 of the power supply controlling apparatus 300 notifies the processing unit 14 of the power supply controlling apparatus 200 of the number "2" (step S12).

After step S12, the processing unit 14 of the power supply controlling apparatus 200 notifies the processing unit 14 of the power supply controlling apparatus 300 of given information (step S13). As described in step S7 of FIG. 3B, the processing unit 14 of the power supply controlling apparatus 100 notifies the processing unit 14 of the power supply controlling apparatus 200 of the information on the electric power which the power supply controlling apparatus 100 has supplied to the devices 4, and the information on the communication with the terminal device 6. The processing unit 14 of the power supply controlling apparatus 200 notifies the processing unit 14 of the power supply controlling apparatus 300 of the information on the electric power which the power supply controlling apparatus 100 has supplied to the devices 4, the information on the communication with the terminal device 6, and the information on the electric power which the power supply controlling apparatus 200 has supplied to the devices 4.

The processing unit 14 of the power supply controlling apparatus 300 confirms whether the processing unit 14 of the power supply controlling apparatus 300 can communicate with the processing unit 14 of the power supply controlling apparatus 100 (step S14). As described above, the connection between the power supply controlling apparatus 100 and the network 2 is cut, and the communication between the power supply controlling apparatus 300 and the power supply controlling apparatus 100 is also interrupted.

After step S14, the processing unit 14 of the power supply controlling apparatus 300 confirms whether the processing unit 14 of the power supply controlling apparatus 300 can communicate with the processing unit 14 of the power supply controlling apparatus 200 (step S15). As illustrated in FIG. 4A, the power supply controlling apparatus 300 is connected to the power supply controlling apparatus 200 by the network 2, and hence the processing unit 14 of the power supply controlling apparatus 300 can communicate with the processing unit 14 of the power supply controlling apparatus 200.

After step S15, the processing unit 14 of the power supply controlling apparatus 300 notifies the processing unit 14 of the power supply controlling apparatus 200 of given information (step S16). The given information includes information on the electric power which the power supply controlling apparatus 300 has supplied to the devices 4.

As described above, when the power supply controlling apparatus 100 that has functioned as the master is lost, the power supply controlling apparatus 200 that has functioned as the slave functions as the master by using the information on the communication with the terminal device 6 notified from the power supply controlling apparatus 100. As described in step S13, the processing unit 14 of the power supply controlling apparatus 200 that functions as the master notifies the processing unit 14 of the power supply controlling apparatus 300 that functions as the master, of information on the electric power which the power supply controlling apparatus 200 has supplied to the devices 4, and information on the communication with the terminal device 6. On the other hand, the processing unit 14 of the power supply controlling apparatus 300 notifies the processing unit 14 of the power supply controlling apparatus 200 of information on the electric power which the power supply controlling apparatus 300 has supplied to the devices 4, as described in step S16.

Figure 5:
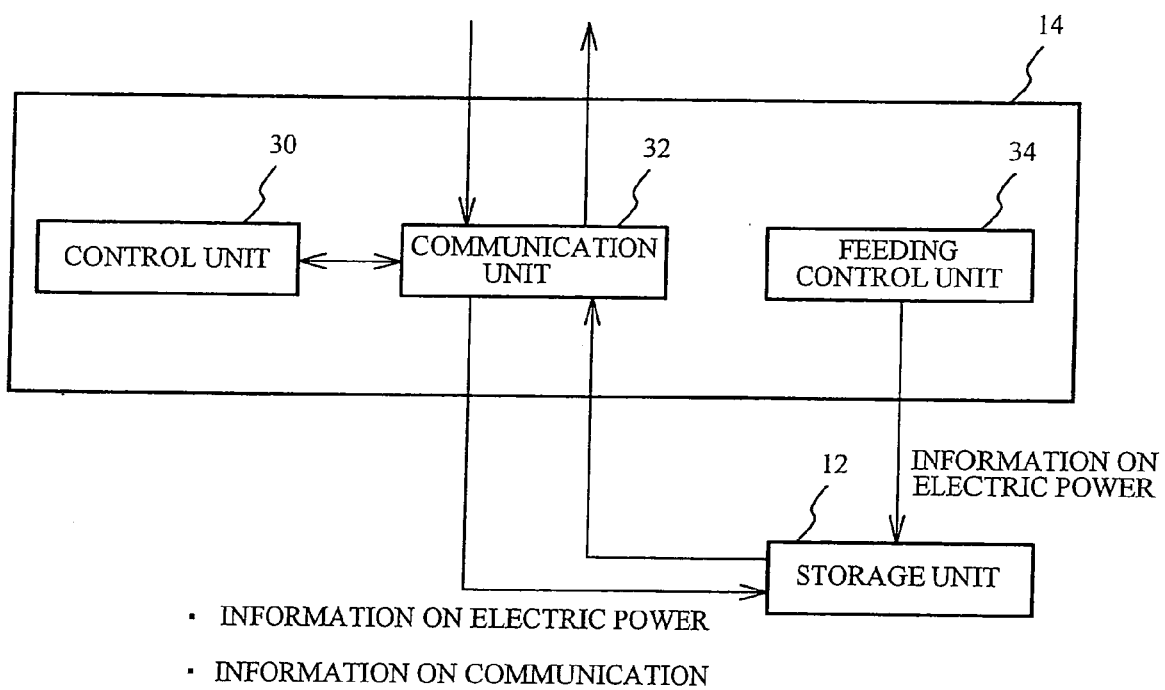
FIG. 5 is a functional block diagram illustrating the configuration of the power supply controlling apparatus according to the embodiment.

Next, a description will now be given of the power supply controlling apparatus. FIG. 5 is a functional block diagram illustrating the configuration of the power supply controlling apparatus 100. The configuration of each of the power supply controlling apparatuses 200 and 300 is the same as that of the power supply controlling apparatus 100, and therefore description thereof is omitted.

The processing unit 14 functions as a control unit 30, a communication unit 32, and a feeding control unit 34. The feeding control unit 34 controls the power supply to the devices 4 by the power supply controlling apparatus. The feeding control unit 34 obtains information on the electric power which the power supply controlling apparatus including the feeding control unit 34 has supplied to the devices 4.

When the power supply controlling apparatus functions as the master (hereinafter referred to as a "master power supply controlling apparatus"), the communication unit 32 thereof controls communication with the terminal device 6 and communication with the power supply controlling apparatus that functions as the slave (hereinafter referred to as a "slave power supply controlling apparatus"). The communication unit 32 of the master power supply controlling apparatus transmits a number assigned to the master power supply controlling apparatus, information on the electric power which the master power supply controlling apparatus has supplied to the devices 4 connected thereto, and information on the communication with the terminal device 6, to the slave power supply controlling apparatus. The communication unit 32 of the master power supply controlling apparatus receives information on the electric power which the slave power supply controlling apparatus has supplied to the devices 4 connected thereto, from the slave power supply controlling apparatus. The storage unit 12 of the master power supply controlling apparatus stores the information on the electric power which the master power supply controlling apparatus has supplied to the devices 4 connected thereto, and the information on the electric power which the slave power supply controlling apparatus has supplied to the devices 4 connected thereto.

On the other hand, when the power supply controlling apparatus functions as the slave, the communication unit 32 of the slave power supply controlling apparatus controls the communication with the master power supply controlling apparatus. The communication unit 32 of the slave power supply controlling apparatus transmits information on the electric power which the slave power supply controlling apparatus has supplied to the devices 4 connected thereto, to the master power supply controlling apparatus. The communication unit 32 of the slave power supply controlling apparatus receives the number assigned to the master power supply controlling apparatus, the information on the electric power which the master power supply controlling apparatus has supplied to the devices 4 connected thereto, and the information on the communication with the terminal device 6, from the master power supply controlling apparatus. The storage unit 12 of the slave power supply controlling apparatus stores the information on the electric power which the master power supply controlling apparatus has supplied to the devices 4 connected thereto, and the information on the electric power which the slave power supply controlling apparatus has supplied to the devices 4 connected thereto, and the information on the communication with the terminal device 6 received from the communication unit 32.

When the communication unit 32 of the slave power supply controlling apparatus cannot communicate with the master power supply controlling apparatus, the control unit 30 of the slave power supply controlling apparatus causes the slave power supply controlling apparatus to function as the master power supply controlling apparatus, as described in FIGS. 4A and 4B. In an example of FIG. 1, the power supply controlling apparatus 100 mediates the communication between the power supply controlling apparatus 200 and the terminal device 6. The control unit 30 of the power supply controlling apparatus 200 controls the communication unit 32 thereof so that the power supply controlling apparatus 200 communicates with the terminal device 6 without mediating or relaying the power supply controlling apparatus 100 according to the interruption of the communication between the power supply controlling apparatuses 100 and 200.

Figure 6:
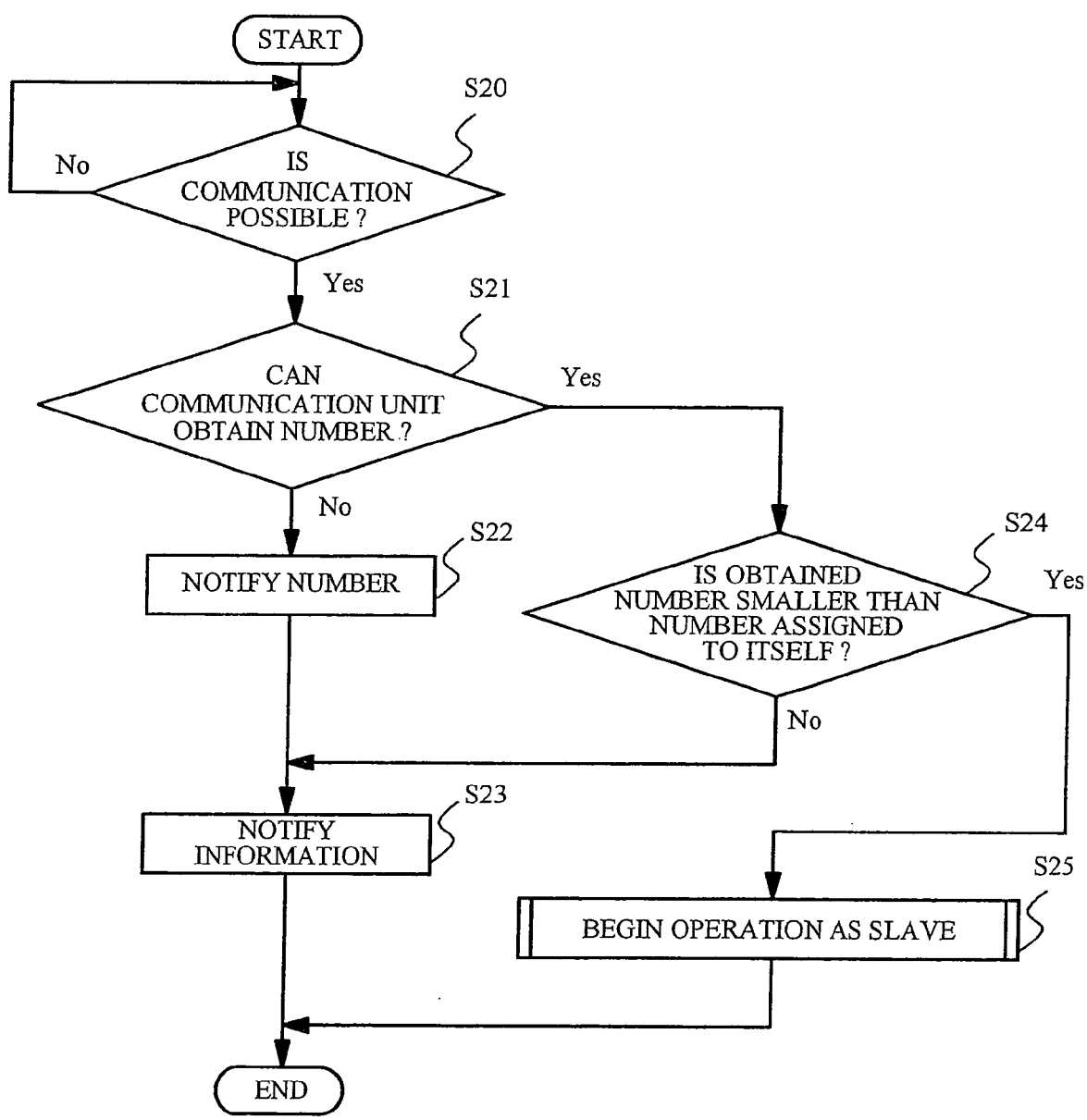
FIG. 6 is a flowchart illustrating the control of a power supply controlling apparatus 100 that functions as a master.

Next, a description will now be given of the control of the power supply controlling apparatus, with reference to a flowchart. First, the operation of the power supply controlling apparatus that functions as the master is described. FIG. 6 is a flowchart illustrating the control of the power supply controlling apparatus 100 that functions as the master.

As illustrated in FIG. 6, the communication unit 32 of the power supply controlling apparatus 100 judges whether the communication unit 32 can communication with another power supply controlling apparatus (step S20). As described in step S1 of FIG. 3B, the communication unit 32 retrieves a MAC address that can be communicated with the communication unit 32, for example. When the answer to the judgment of step S20 is "No", the judgment of step S20 is repeated until the communication unit 32 can communication with another power supply controlling apparatus.

When the answer to the judgment of step S20 is "Yes", the communication unit 32 of the power supply controlling apparatus 100 judges whether the communication unit 32 can obtain the number assigned to another power supply controlling apparatus, from power supply controlling apparatus (step S21). This control corresponds to step S3 of FIG. 3B.

When the answer to the judgment of step S21 is "No", the communication unit 32 of the power supply controlling apparatus 100 notifies another power supply controlling apparatus of the number assigned to the power supply controlling apparatus 100 (step S22). As illustrated in step S4 of FIG. 3B, the communication unit 32 of the power supply controlling apparatus 100 notifies the power supply controlling apparatus 200 of the number "1". After step S22, the communication unit 32 of the power supply controlling apparatus 100 notifies another power supply controlling apparatus of given information (step S23). This control corresponds to step S7 of FIG. 3B.

When the answer to the judgment of step S21 is "Yes", the communication unit 32 of the power supply controlling apparatus 100 obtains the number assigned to another power supply controlling apparatus, from another power supply controlling apparatus, and judges whether the obtained number is smaller than the number assigned to the power supply controlling apparatus 100 (step S24). When the answer to the judgment of step S24 is "No", the procedure proceeds to step S23, and the power supply controlling apparatus 100 functions as the master. That is, the control unit 30 of the power supply controlling apparatus 100 controls the communication unit 32 of the power supply controlling apparatus 100 so that the power supply controlling apparatus 100 communicate with the terminal device 6 without mediating or relaying another power supply controlling apparatus and mediates the communication between another power supply controlling apparatus and the terminal device 6.

When the answer to the judgment of step S24 is "Yes", the power supply controlling apparatus 100 begins the operation as the slave (step S25). That is, the control unit 30 of the power supply controlling apparatus 100 controls the communication unit 32 of the power supply controlling apparatus 100 so that the power supply controlling apparatus 100 communicates with the terminal device 6 via another power supply controlling apparatus. After steps S23 and S25, the procedure is terminated.

Figure 7:
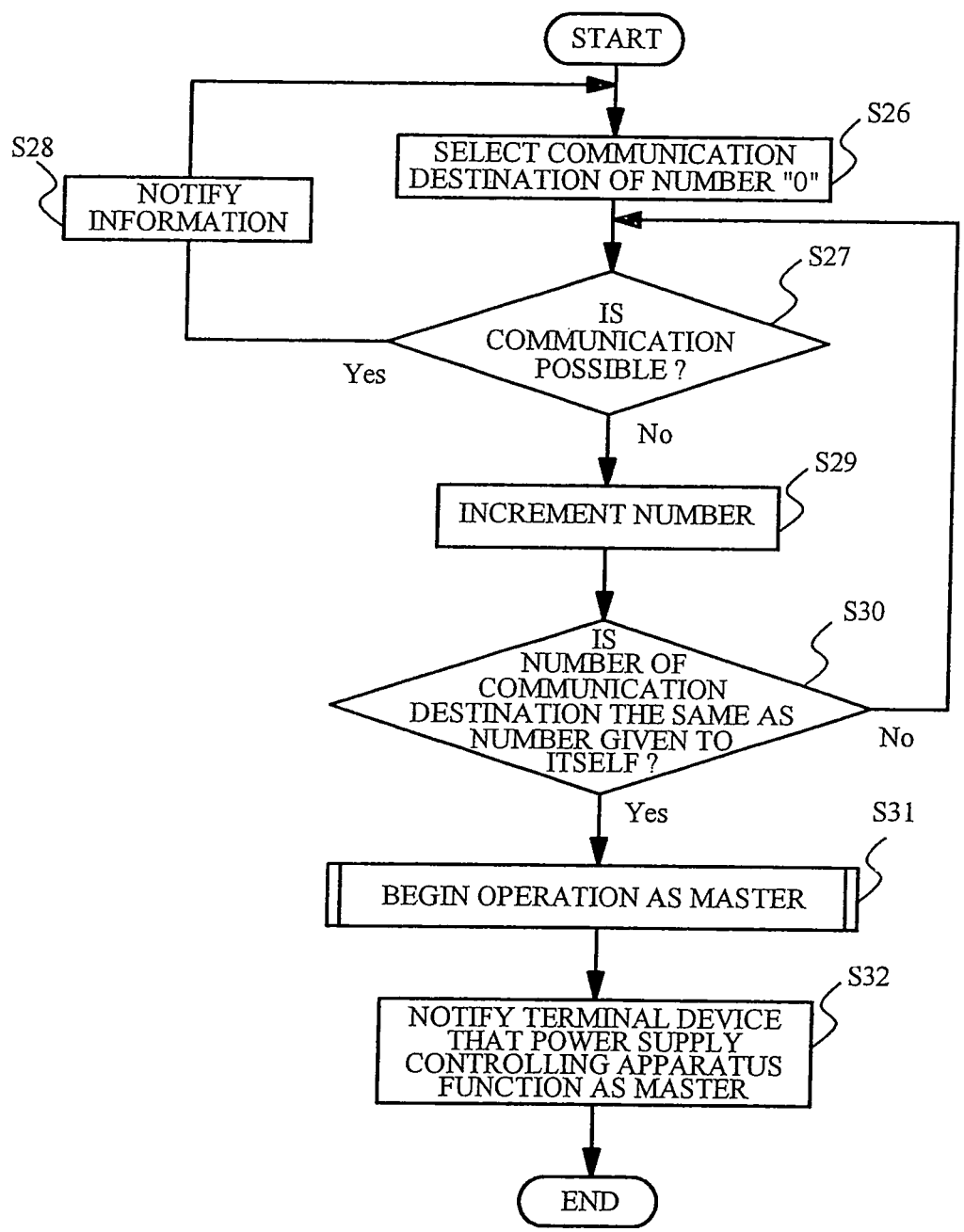
FIG. 7 is a flowchart illustrating the control of a power supply controlling apparatus 200 that functions as a slave.

Next, a description will now be given of the control of the power supply controlling apparatus that functions as the slave. FIG. 7 is a flowchart illustrating the control of the power supply controlling apparatus 200 that functions as the slave.

As illustrated in FIG. 7, the communication unit 32 of the power supply controlling apparatus 200 selects the power supply controlling apparatus to which the number "0" is given, as a communication destination (step S26). That is, the communication unit 32 of the power supply controlling apparatus 200 selects the power supply controlling apparatus 100 as the communication destination. After step S26, the communication unit 32 of the power supply controlling apparatus 200 judges whether the communication unit 32 can communicate with the power supply controlling apparatus 100 to which the number "0" is given (step S27). This control corresponds to step S8 of FIG. 3B or step S10 of FIG. 4B. When the answer to the judgment of step S27 is "Yes", the communication unit 32 of the power supply controlling apparatus 200 notifies the power supply controlling apparatus 100 of the given information (step S28). This control corresponds to step S9 of FIG. 3B. After step S28, the procedure returns to step S26.

When the answer to the judgment of step S27 is "No", the communication unit 32 of the power supply controlling apparatus 200 increments the number given to the power supply controlling apparatus as the communication destination by one (step S29). That is, the communication unit 32 changes the communication destination from the power supply controlling apparatus to which the number "0" is given, to the power supply controlling apparatus to which the number "1" is given. The control of "No" of step S27 corresponds to step S10 of FIG. 4B.

After step S29, communication unit 32 of the power supply controlling apparatus 200 judges whether the number incremented by step S29 is the same as the number given to the power supply controlling apparatus 200 itself (step S30). Since the number given to the power supply controlling apparatus 200 is "1", the answer to the judgment of step S30 becomes "Yes". When the answer to the judgment of step S30 is "Yes", the power supply controlling apparatus 200 begins the operation as the master (step S31). That is, the control unit 30 of the power supply controlling apparatus 200 controls the communication unit 32 of the power supply controlling apparatus 200 so that the power supply controlling apparatus 200 communicates with the terminal device 6 without mediating or relaying another power supply controlling apparatus. After step S31, the control unit 30 of the power supply controlling apparatus 200 notifies the terminal device 6 that the power supply controlling apparatus 200 functions as the master (step S32). After step S32, the procedure is terminated.

When the answer to the judgment of step S30 is "No", the procedure returns to step S27. It is assumed that the power supply controlling apparatus 300 executes the control of FIG. 7 and the answer to the judgment of step S30 is "No", for example. The number given to the power supply controlling apparatus 300 is "2", and the number incremented by step S29 is "1". Therefore, the control of the power supply controlling apparatus 300 in step S30 becomes "No", and the procedure returns to step S27. Then, the power supply controlling apparatus 300 continues the operation as the slave.

According to the embodiment, even when the power supply controlling apparatus 100 that has functioned as the master is lost, the power supply controlling apparatus 200 that has functioned as the slave functions as the master on behalf of the power supply controlling apparatus 100. Therefore, it is avoided that the master is lost from the power supply controlling system 1. As a result, the user can manage the power supply effectively through the master.

The power supply controlling apparatus 100 that functions as the master notifies the power supply controlling apparatuses 200 and 300 that function as the slaves of the information on the communication with the terminal device 6. Therefore, when any one of the power supply controlling apparatuses 200 and 300 functions as the master, any one of the power supply controlling apparatuses 200 and 300 can communicate with the terminal device 6 by using the information notified from the power supply controlling apparatus 100. Thereby, it is possible to change the master smoothly.

The power supply controlling apparatuses that function as the master and the slave notify each other of the information on the electric power which each of the power supply controlling apparatuses has supplied to the devices 4 connected thereto, and share the information on the electric power with each other. Therefore, even when the communication between the terminal device 6 and the master power supply controlling apparatus is interrupted, the information on the electric power which the master power supply controlling apparatus has supplied to the devices 4 is not lost. That is, when the power supply controlling apparatus 200 functions as a master on behalf of the power supply controlling apparatus 100, the power supply controlling apparatus 200 notifies the terminal device 6 of the information on the electric power which the power supply controlling apparatus 100 has supplied to the devices 4 connected thereto. Thereby, the user can know the information on the electric power which the power supply controlling apparatus 100, in which the communication with the terminal device 6 has been interrupted, has supplied to the devices 4 connected thereto. Therefore, the history of the electric power and the electric power amount which the power supply controlling system 1 has supplied to the devices 4 can be left, and hence the power supply controlling system 1 can monitor the power supply.

Not only the power supply controlling apparatus 100 that functions as the master and the power supply controlling apparatuses 200 and 300 that function as the slaves notify each other of the information on the electric power, but also the power supply controlling apparatuses 200 and 300 may notify each other of the information on the electric power. Thereby, the information on the electric power is kept effectively.

The numbers "0", "1", and "2" are given to the power supply controlling apparatuses 100, 200, and 300, respectively. One of the power supply controlling apparatuses functions as the master in small numerical order. That is, one of the power supply controlling apparatuses operates as the master based on predetermined order. Thereby, the master is changed smoothly. In the embodiment, the numbers are given to the power supply controlling apparatuses in order of the connection to the network 2, but a method for giving the numbers to the respective power supply controlling apparatuses is not limited to this. For example, the user may arbitrarily provide order.

Since the terminal device 6 is notified of the change of the master as described in step S32 of FIG. 7, the user can know the change of the master quickly. A method of the notification is an e-mail, for example. For example, the power supply controlling apparatus generates sound and/or turns on a light such as a LED (Light Emitting diode) in the case of the change of the master, so that the power supply controlling apparatus can notify the user of the change of the master.

It is assumed that the master is changed to the power supply controlling apparatus 200 as illustrated in FIG. 4A, and then the power supply controlling apparatus 100 that has functioned as the master is connected to the network 2. In this case, a current state may return to a state before the change. That is, the power supply controlling apparatus 100 may function as the master, and the power supply controlling apparatus 200 may function as the slave. Alternatively, the power supply controlling apparatus 200 may keep functioning as the master, and the power supply controlling apparatus 100 may function as the slave.

Although in the embodiment, the power supply controlling system 1 includes three power supply controlling apparatuses, the number of power supply controlling apparatuses is not limited to this. The number of power supply controlling apparatuses may be equal to or more than two or four. Although it is assumed that the power supply controlling apparatuses 100, 200 and 300 are the same models, the power supply controlling apparatuses 100, 200 and 300 may be different models. Although each of the power supply controlling apparatuses in FIG. 1 supplies the electric power to three devices 4, the number of devices 4 may be one and may be equal to or more than four.

The processing unit 14 of the power supply controlling apparatus may execute a software program for realizing the functions of the power supply controlling apparatus, so as to achieve the same effects as that of the above-described embodiment.

When the software program for realizing the functions of the power supply controlling apparatus is distributed, a non-transitory recording medium on which the software program is recorded, such as a CD-ROM (Compact Disk Read Memory) or a DVD (Digital Versatile Disk), may be sold. Alternatively, a storage in a server computer stores the software program, and the server computer may transfer the software program to another computer via a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A power supply controlling system comprising:
   a first power supply controlling apparatus that supplies an electric power to a device; and
   a second power supply controlling apparatus that supplies an electric power to another device, communicates with the first power supply controlling apparatus, and mediates communication between the first power supply controlling apparatus and a terminal device to control power supply to the device, the terminal device controlling the power supply to the device;
   wherein the first power supply controlling apparatus assumes a function of the second power supply controlling apparatus based on information received from the terminal device without relaying the second power supply controlling apparatus, when the communication between the first power supply controlling apparatus and the second power supply controlling apparatus is interrupted.

2. The power supply controlling system according to claim 1, wherein the first power supply controlling apparatus notifies the second power supply controlling apparatus of information on the electric power which the first power supply controlling apparatus has supplied to the device, and the second power supply controlling apparatus notifies the first power supply controlling apparatus of information on the electric power which the second power supply controlling apparatus has supplied to the another device, and information on communication with the terminal device.

3. The power supply controlling system according to claim 2, wherein when the communication between the first power supply controlling apparatus and the second power supply controlling apparatus is interrupted, the first power supply controlling apparatus notifies the terminal device of the information on the electric power which the second power supply controlling apparatus has supplied to the another device, the information on the electric power being notified from the second power supply controlling apparatus.

4. The power supply controlling system according to claim 1, wherein another first power supply controlling apparatus of the first group of power supply controlling apparatuses communicates with the terminal device through the second power supply controlling apparatus.

5. The power supply controlling system according to claim 4, wherein the second power supply controlling apparatus gives a unique number to each of the first power supply controlling apparatuses, and the order is determined based on the unique number given to each of the first power supply controlling apparatuses.

6. The power supply controlling system according to claim 1, wherein the first power supply controlling apparatus notifies the terminal device that the first power supply controlling apparatus communicates with the terminal device without relaying the second power supply controlling apparatus to control the power supply to the device.

7. A control method for the power supply controlling system that includes a first power supply controlling apparatus that supplies an electric power to a device, and a second power supply controlling apparatus that mediates communication between the first power supply controlling apparatus and a terminal device, the control method comprising:

judging whether the second power supply controlling apparatus is capable of communicating with the first power supply controlling apparatus; and causing the first power supply controlling apparatus to assume a function of the second power supply controlling apparatus based on information received from the terminal device without relaying the second power supply controlling apparatus to control power supply to the device when the communication between the first power supply controlling apparatus and the second power supply controlling apparatus is interrupted.

8. A power supply controlling apparatus that supplies an electric power to a device, comprising:

a communication portion that communicates with another power supply controlling apparatus, and communicates with a terminal device to control power supply to the device, the another power supply controlling apparatus supplying an electric power to another device, and the terminal device controlling power supply to the device through the another power supply controlling apparatus; and a control portion that controls the communication portion to assumes a function of the another power supply controlling apparatus based on information received from the terminal device without relaying the another power supply controlling apparatus to control power supply to the device, when the communication with the another power supply controlling apparatus is interrupted.

* * * * *